(12) United States Patent
Miyashita

(10) Patent No.: US 8,051,833 B2
(45) Date of Patent: Nov. 8, 2011

(54) THROTTLE VALVE CONTROL APPARATUS OF AN INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 636 days.

(21) Appl. No.: 12/223,788

(22) PCT Filed: Jun. 5, 2007

(86) PCT No.: PCT/IB2007/001468
§ 371 (c)(1),
(2), (4) Date: Aug. 8, 2008

(87) PCT Pub. No.: WO2007/141624
PCT Pub. Date: Dec. 13, 2007

(65) Prior Publication Data
US 2009/0070010 A1   Mar. 12, 2009

(30) Foreign Application Priority Data
Jun. 7, 2006   (JP) .................................. 2006-158315

(51) Int. Cl.
*F02D 41/14* (2006.01)
*F02D 9/02* (2006.01)
(52) U.S. Cl. ...................................................... 123/403
(58) Field of Classification Search .................. 123/403, 123/399, 361, 198 F; 60/285, 276, 274
See application file for complete search history.

(56) References Cited

U.S. PATENT DOCUMENTS

| | | | | |
|---|---|---|---|---|
| 4,200,083 A | * | 4/1980 | Ishida | 123/198 F |
| 4,257,371 A | * | 3/1981 | Ishida | 123/198 F |
| 4,316,438 A | * | 2/1982 | Iizuka | 123/198 F |
| 4,483,288 A | * | 11/1984 | Ueno et al. | 123/481 |
| 5,027,769 A | * | 7/1991 | Yoshida et al. | 123/399 |
| 5,749,221 A | * | 5/1998 | Kawahira et al. | 123/692 |
| 6,874,463 B1 | | 4/2005 | Bolander et al. | |

FOREIGN PATENT DOCUMENTS

| | | |
|---|---|---|
| DE | 3904832 A1 | 8/1990 |
| DE | 102 39 397 A1 | 3/2004 |
| EP | 1 422 410 A2 | 5/2004 |
| JP | A-05-018303 | 1/1993 |
| JP | A-11-303657 | 11/1999 |

* cited by examiner

Primary Examiner — Hieu T Vo
(74) Attorney, Agent, or Firm — Oliff & Berridge, PLC

(57) ABSTRACT

The invention provides a throttle valve control apparatus of an internal combustion engine having at least a first cylinder group (B1) and a second cylinder group (B2). A first throttle valve (S1) is arranged in an intake passage (31) of the first cylinder group and a second throttle valve (S2) is arranged in an intake passage (32) of the second cylinder group. The throttle valve control apparatus includes a controller that, when there is a demand to switch a combustion air-fuel ratio of the internal combustion engine without changing engine output, first changes an opening amount of the first throttle valve, and then changes an opening amount of the second throttle valve.

12 Claims, 3 Drawing Sheets

THROTTLE VALVE CONTROL APPARATUS OF AN INTERNAL COMBUSTION ENGINE

BACKGROUND OF THE INVENTION

1. Field of the Invention

The invention relates to a throttle valve control apparatus of an internal combustion engine.

2. Description of the Related Art

Japanese Patent Application Publication No. 5-18303, for example, proposes technology for controlling a throttle valve opening amount, when switching a combustion air-fuel ratio without changing engine output, to realize a target intake air amount with respect to the combustion air-fuel ratio after the switch.

Typically when the throttle valve opening amount is changed, there is a response delay of the intake air, during which time the engine output tends to fluctuate. As a result, when the throttle valve opening amount is changed in order to switch the combustion air-fuel ratio, the engine output is not able to remain constant so the driver may feel torque shock.

SUMMARY OF THE INVENTION

This invention thus provides a throttle valve control apparatus of an internal combustion engine, which reduces torque shock felt by a driver when the throttle valve opening amount is changed according to a demand to switch the combustion air-fuel ratio without changing the engine output.

One aspect of the invention relates to a throttle valve control apparatus of an internal combustion engine having a first cylinder group and a second cylinder group. A first throttle valve is arranged in an intake passage of the first cylinder group and a second throttle valve is arranged in an intake passage of the second cylinder group. The throttle valve control apparatus includes a controller that, when there is a demand to switch a combustion air-fuel ratio of the internal combustion engine without changing engine output, first changes an opening amount of the first throttle valve, and then changes an opening amount of the second throttle valve (i.e., there is a delay between the time the opening amount of the first throttle valve is changed and the time the second throttle valve is changed, with the first throttle valve being changed first and the second throttle valve being changed afterwards).

According to this aspect of the invention, after first switching the combustion air-fuel ratio of the first cylinder group by changing the opening amount of the first throttle valve, the combustion air-fuel ratio of the second cylinder group is then switched by changing the opening amount of the second throttle valve. As a result, the torque shock generated when the opening amount of the first throttle valve is changed and the torque shock generated when the opening amount of the second throttle valve is changed is each less than the torque shock generated when the opening amounts of the first and second throttle valves are changed simultaneously in order to simultaneously switch the combustion air-fuel ratios of the first and second cylinder groups. Although torque shock is generated twice in this case, the torque shock felt by the driver is reduced.

The internal combustion engine may also include a first three way catalytic device arranged in an exhaust passage of the first cylinder group, a second three way catalytic device arranged in an exhaust passage of the second cylinder group, and a $NO_X$ storage catalytic device arranged in a common exhaust passage of the first cylinder group and the second cylinder group downstream of the first three way catalytic device and the second three way catalytic device. When there is a demand to switch the combustion air-fuel ratio of the internal combustion engine from a lean air-fuel ratio to a rich air-fuel ratio without changing the engine output at this time, the controller may first reduce the opening amount of the first throttle valve to switch the combustion air-fuel ratio of the first cylinder group from the lean air-fuel ratio to the rich air-fuel ratio, and then reduce the opening amount of the second throttle valve to switch the combustion air-fuel ratio of the second cylinder group from the lean air-fuel ratio to the rich air-fuel ratio when or just before exhaust gas of the rich air-fuel ratio flows out from the first three way catalytic device.

As a result, the torque shock generated when the opening amount of the first throttle valve is reduced and the torque shock generated when the opening amount of the second throttle valve is reduced is each less than the torque shock generated when the opening amounts of the first and second throttle valves are reduced simultaneously in order to simultaneously switch the combustion air-fuel ratios of the first and second cylinder groups from lean air-fuel ratios to rich air-fuel ratios. As a result, the torque shock felt by the driver is reduced.

Also, initially, the exhaust gas of the stoichiometric air-fuel ratio that flows out from the first three way catalytic device mixes with the exhaust gas of the lean air-fuel ratio that flows out from the second three way catalytic device arranged in the exhaust passage of the second cylinder group. As a result, exhaust gas of a lean air-fuel ratio flows into the $NO_X$ storage catalytic device arranged in the common exhaust passage of the first and second cylinder groups. Next, the exhaust gas of the rich air-fuel ratio that flows out from the first three way catalytic device mixes with the exhaust gas of the stoichiometric air-fuel ratio that flows out from the second three way catalytic device until almost all of the oxygen stored in the second three way catalytic device is released. As a result, exhaust gas of a rich air-fuel ratio flows into the $NO_X$ storage catalytic device. Then exhaust gas of a rich air-fuel ratio flows out from the first three way catalytic device and the second three way catalytic device into the $NO_X$ storage catalytic device.

If exhaust gas of the stoichiometric air-fuel ratio flows into the $NO_X$ storage catalytic device, then $NO_X$ that is stored will be released from the $NO_X$ storage catalytic device because the oxygen concentration in the exhaust gas at this time is low. However, because the exhaust gas contains almost no reducing substances such as HC and CO, this $NO_X$ ends up being released as it is into the atmosphere. However, according to this throttle valve control apparatus, as described above, when there is a demand to switch the combustion air-fuel ratio of the internal combustion engine from a lean air-fuel ratio to a rich air-fuel ratio without changing the engine output, exhaust gas of the stoichiometric air-fuel ratio does not flow into the $NO_X$ storage catalytic device. When exhaust gas of a lean air-fuel ratio flows into the $NO_X$ storage catalytic device, $NO_X$ in the exhaust gas is stored, not released, because the oxygen concentration in the exhaust gas is high. When the exhaust gas of a rich air-fuel ratio flows into the $NO_X$ catalytic device, the stored $NO_X$ is released because the oxygen concentration in the exhaust gas is low, but this $NO_X$ is reduced and purified by the reducing substance in the exhaust gas.

When there is a demand to switch the combustion air-fuel ratio of the internal combustion engine from a rich air-fuel ratio to a lean air-fuel ratio without changing the engine output, the controller may increase the opening amounts of the first and second throttle valves simultaneously to switch the combustion air-fuel ratios of the first and second cylinder groups from the rich air-fuel ratio to the lean air-fuel ratio.

Thus, the combustion air-fuel ratios of the first and second cylinder groups are simultaneously switched from rich air-fuel ratios to lean air-fuel ratios by increasing the opening amounts of the first and second throttle valves simultaneously. As a result, HC and CO in the exhaust gas of the rich air-fuel ratio is suppressed from being released into the atmosphere as it would be if the combustion air-fuel ratio of either the first or the second cylinder group were kept rich.

Also, when there is a demand to switch the combustion air-fuel ratio of the internal combustion engine from a rich air-fuel ratio to a lean air-fuel ratio without changing the engine output, the controller may increase the opening amount of one throttle valve among the first throttle valve and the second throttle valve in order to switch the combustion air-fuel ratio of one cylinder group among the first cylinder group and the second cylinder group from the rich air-fuel ratio to the lean air-fuel ratio, and increase the opening amount of the other throttle valve at the same time as, or after, the opening amount of the one throttle valve is increased in order to switch the combustion air-fuel ratio of the other cylinder group among the first cylinder group and the second cylinder group first from the rich air-fuel ratio to the stoichiometric air-fuel ratio simultaneously with the switch in the combustion air-fuel ratio of the one cylinder group, and then from the stoichiometric air-fuel ratio to the lean air-fuel ratio.

As a result, HC and CO in the exhaust gas of the rich air-fuel ratio is suppressed from being released into the atmosphere as it would be if the combustion air-fuel ratio of either the first cylinder group or the second cylinder group were kept at the rich air-fuel ratio.

When the opening amount of the one throttle valve from among the first throttle valve and the second throttle valve is increased in a case where the opening amount of the other throttle valve from among the first throttle valve and the second throttle valve is increased after the opening amount of the one throttle valve is increased, the combustion air-fuel ratio of the other cylinder group from among the first cylinder group and the second cylinder group is switched to the stoichiometric air-fuel ratio by fuel injection quantity control without changing the intake air amount. Therefore, together with ignition timing control, the engine output can be kept substantially constant and torque shock will only occur in one of the cylinder groups from among the first cylinder group and the second cylinder group at this time. Also, when the opening amount of the other throttle valve from among the first throttle valve and the second throttle valve is increased, torque shock will only occur in the other cylinder group from among the first cylinder group and the second cylinder group. In this way, the torque shock felt by the driver is reduced.

Also, when increasing the opening amount of the other throttle valve from among the first throttle valve and the second throttle valve at the same time the opening amount of the one throttle valve is increased, the combustion air-fuel ratio of the other cylinder group from among the first cylinder group and the second cylinder group is switched from the rich air-fuel ratio to the stoichiometric air-fuel ratio so the generated torque shock is less than it is when that combustion air-fuel ratio is switched from the rich air-fuel ratio to the lean air-fuel ratio. In this way, although torque shock is generated simultaneously in both the first and second cylinder groups, this torque shock is less than it is when the combustion air-fuel ratios of the first and second cylinder groups are simultaneously switched from rich air-fuel ratios to lean air-fuel ratios, so the torque shock felt by the driver can be reduced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
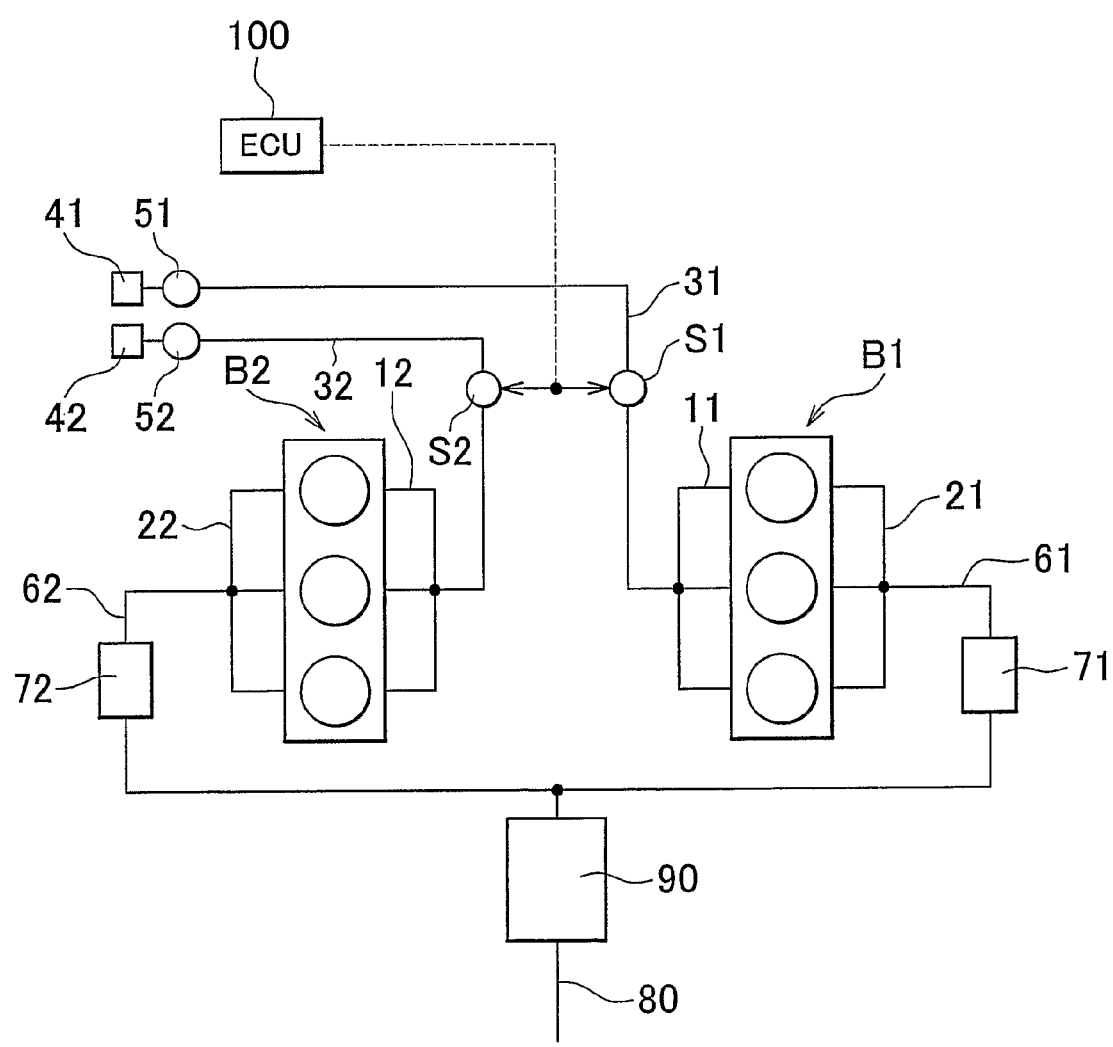
FIG. 1 is a schematic diagram of an internal combustion engine to which a throttle valve control apparatus according to one example embodiment of the invention can be applied.

FIG. 1 is a schematic diagram of an internal combustion engine to which a throttle valve control apparatus according to one example embodiment of the invention can be applied. This internal combustion engine is a V-type internal combustion engine that has a first bank B1 which may serve as a first cylinder group and a second bank B2 which may serve as a second cylinder group. The internal combustion engine also includes a first intake manifold 11 of the first bank B1 and a second intake manifold 12 of the second bank B2, as well as a first exhaust manifold 21 of the first bank B1 and a second exhaust manifold 22 of the second bank B2. The position of the first bank B1 (and the second bank B2) of the internal combustion engine in the engine compartment of the vehicle is not specified, i.e., it may be arranged at the left or right, front or rear.

The intake systems of the first bank B1 and the second bank B2 are independent from one another. A first intake passage 31 of the first bank B1 is connected to the first intake manifold 11 and a second intake passage 32 of the second bank B2 is connected to the second intake manifold 12. The first intake manifold 31 is open to ambient air via a first air cleaner 41. In the first intake passage 31, a first airflow meter 51 is arranged immediately downstream of the first air cleaner 41, and a first throttle valve S1 is arranged downstream of the first airflow meter 51. Similarly, the second intake manifold 32 is open to ambient air via a second air cleaner 42. In the second intake passage 32, a second airflow meter 52 is arranged immediately downstream of the second air cleaner 42, and a second throttle valve S2 is arranged downstream of the second airflow meter 52. Neither the first throttle valve S1 nor the second throttle valve S2 is mechanically connected to an accelerator pedal. Instead, the opening amounts of both the first throttle valve S1 and the second throttle valve S2 can be set freely by an actuator of a step motor or the like.

A first exhaust passage 61 is connected to the first exhaust manifold 21 of the first bank B1 and a second exhaust passage 62 is connected to the second exhaust manifold 22 of the second bank B2. A first three way catalytic device 71 which is positioned near the first bank B1 is arranged in the first exhaust passage 61, and a second three way catalytic device 72 which is positioned near the second bank B2 is arranged in the second exhaust passage 62. Both the first three way catalytic device 71 and the second three way catalytic device 72 have relatively small heat capacities and thus their temperatures easily rise to the catalyst activation temperature during startup of the engine.

The first exhaust passage 61 and the second exhaust passage 62 merge and connect to a common exhaust passage 80 downstream of the first three way catalytic device 71 and the second three way catalytic device 72. A $NO_X$ storage catalytic device 90 is arranged in this common exhaust passage 80.

The $NO_X$ storage catalytic device 90 stores $NO_X$ (in this specification, it is to be understood that the term "store" or "storage" used herein means retention of a substance (solid, liquid, gas molecules) in the form of at least one of adsorption, adhesion, trapping, occlusion, and others) in the exhaust gas when the oxygen concentration of the exhaust gas flowing into the $NO_X$ storage catalytic device 90 is high and releases stored $NO_X$ when the oxygen concentration of the exhaust gas flowing into the $NO_X$ storage catalytic device 90 is low. The $NO_X$ that is released is reduced and purified if a reducing substance such as HC and CO or the like is present in the exhaust gas.

Homogeneous combustion (or stratified-charge combustion) in which the combustion air-fuel ratio is made leaner than the stoichiometric air-fuel ratio is performed in the first bank B1 and the second bank B2 of the internal combustion engine. The lean air-fuel ratio of this homogeneous combustion is a desired lean air-fuel ratio (such as 20) which produces only a small amount of $NO_X$. However, because $NO_X$ is still produced, the $NO_X$ storage catalytic device 90 stores $NO_X$, thus inhibiting the release of $NO_X$ into the atmosphere.

In this internal combustion engine, for example during engine startup, in order to ensure reliable startup, homogeneous combustion is performed in which the combustion air-fuel ratio is made either equal to or richer than the stoichiometric air-fuel ratio and the ignition timing is retarded (or stratified-charge combustion is performed in which the combustion air-fuel ratio throughout the entire cylinder is made equal to or leaner than the stoichiometric air-fuel ratio and the ignition timing is retarded until the expansion stroke), and HC, CO, and $NO_X$ in the exhaust gas at this time are purified by the first three way catalytic device 71 and the second three way catalytic device 72. Also, even when the engine is operating under a high load which requires high engine output, homogeneous combustion in which the combustion air-fuel ratio is made equal to or richer than the stoichiometric air-fuel ratio may be performed.

During combustion with a lean air-fuel ratio, $NO_X$ in the exhaust gas is stored in the $NO_X$ storage catalytic device 90 as described above. However, there is a limit as to just how much $NO_X$ the $NO_X$ storage catalytic device 90 is able to store. Therefore, a regeneration process which releases, reduces, and purifies $NO_X$ must be performed before the amount of $NO_X$ stored in the $NO_X$ storage catalytic device 90 (hereinafter this amount will be referred to as the "$NO_X$ storage amount") reaches the maximum amount able to be stored in the $NO_X$ storage catalytic device 90. The current $NO_X$ storage amount is estimated or mapped out with the $NO_X$ amount contained in the exhaust gas per unit time for each operating state of the engine during combustion with a lean air-fuel ratio, for example, as the $NO_X$ amount that is stored per unit time for each operating state of the engine, and then estimated as an integrated value thereof. In combustion with the stoichiometric air-fuel ratio or a rich air-fuel ratio, stored $NO_X$ is released so the $NO_X$ amount that is released per unit time for each operating state of the engine at this time may also be accumulated as a negative value.

Also, $SO_X$ contained in the exhaust gas is also stored in the $NO_X$ storage catalytic device 90, similar to $NO_X$, and thus reduces the maximum amount of $NO_X$ able to be stored. As a result, when the amount of stored $SO_X$ (hereinafter this amount will be referred to as the "$SO_X$ storage amount") reaches a set amount, a recovery process to release the $SO_X$ from the $NO_X$ catalytic device 90 is also necessary. Because the $SO_X$ in the exhaust gas is mainly from sulfur S in the fuel, the current $SO_X$ storage amount may be estimated based on the integrated value of the amount of fuel consumed, for example.

In the regeneration and recovery processes, the combustion air-fuel ratios are made rich and the air-fuel ratio of the exhaust gas that flows into the $NO_X$ catalytic device 90 is made a desirable rich air-fuel ratio. In the recovery process, the $NO_X$ storage catalytic device 90 must also rise to approximately 650° C. In this way, in this internal combustion engine, in order to perform the regeneration process or the recovery process, the combustion air-fuel ratio needs to be switched from a lean air-fuel ratio to a rich air-fuel ratio. Further, once the regeneration process or the recovery process ends, the combustion air-fuel ratio needs to be switched from the rich air-fuel ratio back to the lean air-fuel ratio. With this kind of regeneration or recovery process, the switch in the combustion air-fuel ratio from one air-fuel ratio, from among a desired lean air-fuel ratio, the stoichiometric air-fuel ratio, and a desired rich air-fuel ratio, to another one of those air-fuel ratios is necessary, and not performed according to a demand by the driver. The engine output is not changed at this time, for example, so the driver will not feel torque shock.

In order to keep the engine output from changing, the fuel injection quantity before and after the combustion air-fuel ratio is switched must be kept substantially constant (actually, the fuel injection quantity necessary to generate the same output is slightly increased in order from lean air-fuel ratio to the stoichiometric air-fuel ratio to rich air-fuel ratio due to the effect from pumping loss, but to simplify the description the necessary fuel injection quantity before and after the combustion air-fuel ratio is switched will be fixed). Because the required intake air amount for each combustion air-fuel ratio differs greatly with respect to the fixed fuel injection quantity before and after the combustion air-fuel ratio is switched, when switching the combustion air-fuel ratio, the opening amount of the throttle valve is abruptly changed to an opening amount to realize the required intake air amount after the switch. At this time, the required intake air amount after the switch is not immediately realized because of the intake air response delay, thus creating a kind of momentary mid-switch state in which the intake air amount is either more or less than the required intake air amount.

In this mid-switch state, even if air-fuel ratio control is performed based on the intake air amounts drawn into the first bank B1 and the second bank B2 detected by the first airflow meter 51 and the second airflow meter 52, and even if a linear output type air-fuel ratio sensor is arranged immediately downstream of the first exhaust manifold 21 of the first exhaust passage 61 and the second exhaust manifold 22 of the second exhaust passage 62, for example, it is still difficult to precisely realize the intended combustion air-fuel ratio. Although it is not problematic if the actual air-fuel ratio is slightly off from the stoichiometric air-fuel ratio or the desired rich air-fuel ratio, if the actual air-fuel ratio is slightly off from the desired lean air-fuel ratio that was set to suppress the amount of $NO_X$ produced, it may cause the amount of $NO_X$ produced to abruptly increase. Therefore, for example, in the mid-switch state the combustion air-fuel ratio is not controlled to the desired lean air-fuel ratio.

Accordingly, in this mid-switch state, the combustion air-fuel ratio may be controlled to the stoichiometric air-fuel ratio or the desired rich air-fuel ratio before or after the switch. For example, during a switch from a desired lean air-fuel ratio, the intake air amount during the switch increases with respect to the combustion air-fuel ratio after the switch of a fixed fuel injection quantity. Therefore, the amount of fuel injected is increased to realize the combustion air-fuel ratio after the switch. Also, during a switch to a desired lean air-fuel ratio, the intake air amount during the switch is less than the desired lean air-fuel ratio of a fixed fuel injection quantity but increases with respect to the combustion air-fuel ratio before the switch of the fixed fuel injection quantity. Therefore, the amount of fuel injected is increased to realize the combustion air-fuel ratio before the switch.

Thus, if the amount of fuel injected were increased during the switch and no adjustment was made for that increase, the engine output would increase. Therefore, the ignition timing is retarded in accordance with the amount of increase in the injected fuel amount to reduce the engine output so that the engine output is kept constant before, during, and after the switch. If the amount of injected fuel were reduced during the switch, it would be necessary to advance the ignition timing in accordance with the amount of decrease in the injected fuel amount to increase the engine output. However, the ignition timing is generally set to obtain the greatest engine output so a large increase in engine output is unable to be obtained by advancing the ignition timing.

Actually, even with ignition timing control, the engine output is unable to be kept precisely constant. The engine output will fluctuate during switching so torque shock will end up being generated. To combat this, when there is a demand for the combustion air-fuel ratio of the internal combustion engine to be switched without changing the engine output, this throttle valve control apparatus first changes the opening amount of the first throttle valve S1 to switch the combustion air-fuel ratio of the first bank B1, and then changes the opening amount of the second throttle valve S2 to switch the combustion air-fuel ratio of the second bank B2. As a result, the torque shock generated when the opening amount of the first throttle valve S1 is changed and the torque shock generated when the opening amount of the second throttle valve S2 is changed are each less then the torque shock generated when the opening amounts of the first throttle valve S1 and the throttle valve S2 are changed simultaneously to simultaneously switch the combustion air-fuel ratios of the first bank B1 and the second bank B2. Even though torque shock is generated twice, the torque shock felt by the driver is reduced.

Figure 2:
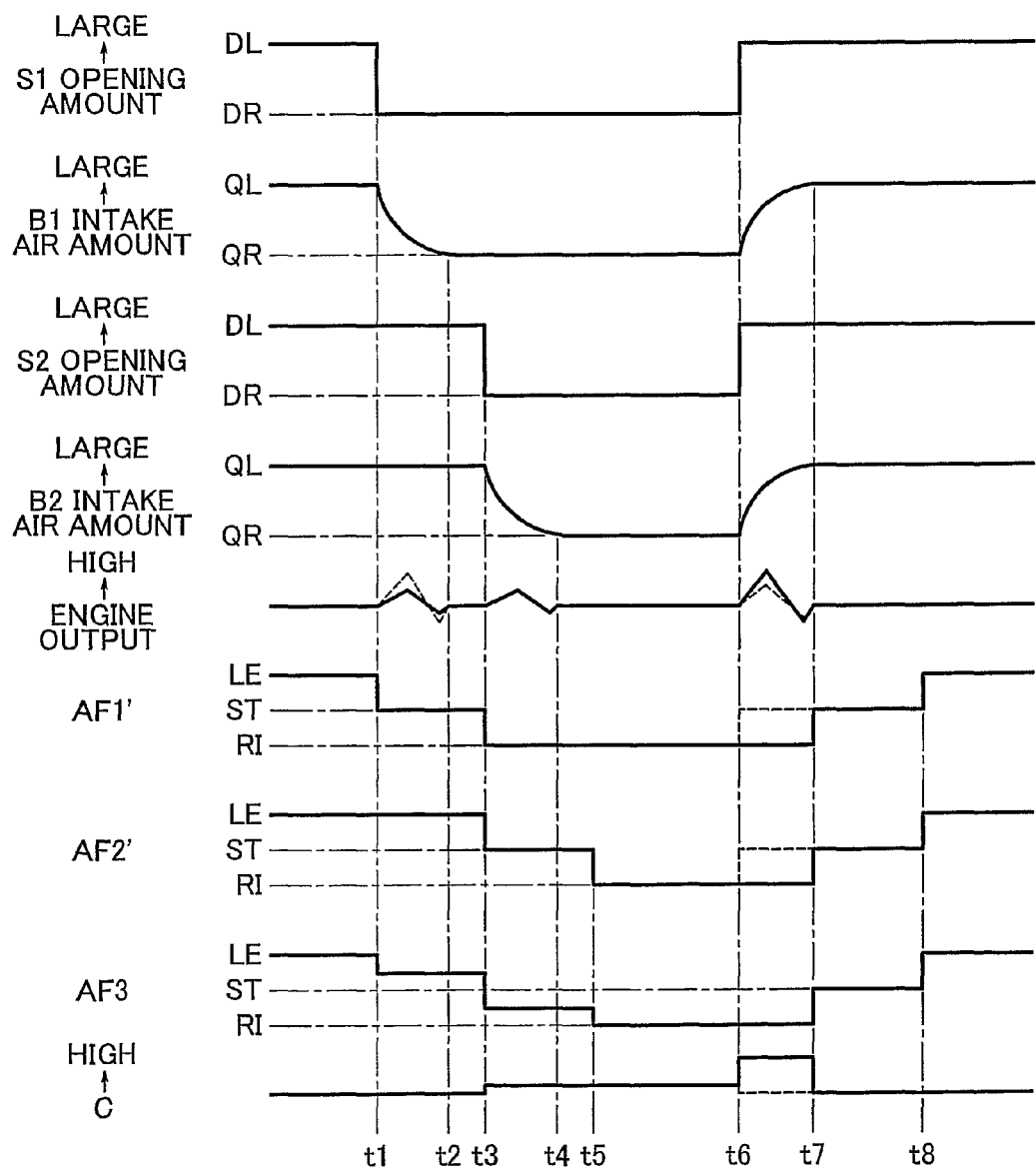
FIG. 2 is a time chart showing changes that occur when the combustion air-fuel ratio is switched in the opening amount of a first throttle valve, the opening amount of a second throttle valve, engine output, the air-fuel ratio of exhaust gas that flows out from a first three way catalytic device, the air-fuel ratio of exhaust gas that flows out from a second three way catalytic device, the air-fuel ratio of exhaust gas that flows into a $NO_X$ storage catalytic device, and the concentration of HC and CO in the exhaust gas that flows out of the $NO_X$ storage catalytic device.

FIG. 2 is a time chart illustrating a case in which the throttle valve control apparatus switches the combustion air-fuel ratio from a desired lean air-fuel ratio to a desired rich air-fuel ratio in order to perform the regeneration process on the $NO_X$ storage catalytic device 90, for example, and then switches the combustion air-fuel ratio from the desired rich air-fuel ratio to the desired lean air-fuel ratio after the regeneration process ends. The control, including the throttle valve control, the air-fuel ratio control and the fuel injection quantity control, of the internal combustion engine in this example embodiment is executed by an engine control unit (ECU) 100 (see FIG. 1), which includes a CPU, RAM and ROM and the like, for example. First at time t1, there is a demand to switch the combustion air-fuel ratio from a desired lean air-fuel ratio LE to a desired rich air-fuel ratio RI without changing the engine output. The opening amount of the throttle valve S1 which until this point was an opening amount DL that realizes a required intake air amount QL for the desired lean air-fuel ratio LE with respect to a required fuel injection quantity F is abruptly reduced to an opening amount DR that realizes a required intake air amount QR for the desired rich air-fuel ratio RI with respect to the required injection fuel quantity F.

The actual intake air amount of the first bank B1 changes only gradually from the required intake air amount QL of the desired lean air-fuel ratio LE to the required intake air amount QR of the desired rich air-fuel ratio RI due to the response delay, and the required intake air amount QR is realized at time t2. While the combustion air-fuel ratio of the first bank B1 is being switched between time t1 and time t2, the amount of injected fuel is increased to more than the required fuel injection quantity F in order to make the combustion air-fuel ratio the desired rich air-fuel ratio RI with respect to the intake air amount of the response delay. Therefore, because the engine output would increase if left as is, the ignition timing is retarded in accordance with the amount of increase in the injected fuel. However, it is difficult to precisely grasp the intake air amount of the response delay, which makes it difficult to keep the engine output constant by the fuel injection quantity control and the ignition timing control. As a result, the engine output may fluctuate during the switch between time t1 and time t2. This fluctuation in output occurs with combustion only in the first bank B1 and is comparatively less than that which occurs with combustion in both banks B1 and B2 as shown by the dashed line. As a result, the torque shock felt by the driver immediately after the opening amount of the first throttle valve S1 is reduced is not that large.

The combustion air-fuel ratio of the first bank B1 switches to the desired rich air-fuel ratio RI from time t1 such that exhaust gas of the desired rich air-fuel ratio RI flows into the first three way catalytic device 71. However, a three way catalytic device typically has $O_2$ storage capability in which it stores excess oxygen when the air-fuel ratio of the inflowing exhaust gas is lean and releases stored oxygen when the air-fuel ratio of the inflowing exhaust gas is rich to bring the air-fuel ratio of the exhaust gas close to the stoichiometric air-fuel ratio. Therefore, until almost all of the stored oxygen is released, the air-fuel ratio FA1' of the exhaust gas that flows out from the first three way catalytic device 71 is substantially the stoichiometric air-fuel ratio ST.

If exhaust gas of the stoichiometric air-fuel ratio ST were to flow into the $NO_X$ storage catalytic device 90, stored $NO_X$ would be released because the oxygen concentration in the exhaust gas would be low. However, the exhaust gas would contain almost no reducing substances such as HC and CO which reduce and purify the released $NO_X$ so the released $NO_X$ would end up being released as it is into the atmosphere. In this example embodiment, while exhaust gas of the stoichiometric air-fuel ratio ST is flowing out from the first three way catalytic device 71, the combustion air-fuel ratio is kept at the desired lean air-fuel ratio LE in the second bank B2 and the air-fuel ratio AF2' of the exhaust gas that flows out from the second three way catalytic device 72 is also the desired lean air-fuel ratio LE.

Accordingly, between time t1 and time t3, at which time almost all of the stored oxygen in the first three way catalytic device 71 has been released and exhaust gas of the desired rich air-fuel ratio RI starts to flow out, the exhaust gas of the stoichiometric air-fuel ratio ST that flows out from the first three way catalytic device 71 mixes with the exhaust gas of the desired lean air-fuel ratio LE that flows out from the second three way catalytic device 72. The resultant air-fuel ratio AF3 of the exhaust gas that flows into the $NO_X$ storage catalytic device 90 is a lean air-fuel ratio that is closer to the stoichiometric air-fuel ratio than the desired lean air-fuel ratio LE is so $NO_X$ will not be released as it is from the $NO_X$ storage catalytic device 90 into the atmosphere.

At time t3, at which time the exhaust gas of the desired rich air-fuel ratio RI starts to flow out from the first three way catalytic device 71, the opening amount of the second throttle valve S2 which until this time was the opening amount DL that realizes the required intake air amount QL for the desired lean air-fuel ratio LE with respect to the required fuel injection quantity F is abruptly reduced to the opening amount DR that realizes the required intake air amount QR for the desired rich air-fuel ratio RI with respect to the required fuel injection quantity F. Time t3 may be determined (by a change from a value indicative of the stoichiometric air-fuel ratio to a value indicative of a rich air-fuel ratio) based on the output of an oxygen sensor arranged immediately downstream of the first three way catalytic device 71, for example.

Similar to the first bank B1, the actual intake air amount of the second bank B2 changes only gradually from the required intake air amount QL to the required intake air amount QR, and at time t4, the required intake air amount QR is realized. During the switch of the combustion air-fuel ratio of the second bank B2 between time t3 and time t4, the combustion air-fuel ratio is made to match the desired rich air-fuel ratio RI, and similar to the first bank B1, the amount of fuel injected is increased to more than the required fuel injection quantity F, while the ignition timing is retarded. The fluctuation in output that occurs during the switch between time t3 and time t4 occurs with combustion only in the second bank B2 and thus is comparatively less than that which occurs with combustion in both banks B1 and B2. As a result, the torque shock felt by the driver immediately after the opening amount of the second throttle valve S2 is reduced is not that large.

The combustion air-fuel ratio of the second bank B2 switches to the desired rich air-fuel ratio from time t3 such that exhaust gas of the desired rich air-fuel ratio RI flows into the second three way catalytic device 72. However, the second three way catalytic device 72 also has $O_2$ storage capability so until time t5 when almost all of the stored oxygen is released, the air-fuel ratio AF2' of the exhaust gas that flows out from the second three way catalytic device 72 is substantially the stoichiometric air-fuel ratio ST.

In this example embodiment, even though exhaust gas of the stoichiometric air-fuel ratio ST flows out from the second three way catalytic device 72, at this time, exhaust gas of the desired rich air-fuel ratio RI is already flowing out from the first three way catalytic device 71 of the first bank B1. Therefore, from time t3 to time t5, at which time almost all of the stored oxygen has been released from the second three way catalytic device 72 and exhaust gas of the desired rich air-fuel ratio RI starts to flow out, the exhaust gas of the desired rich air-fuel ratio RI that flows out from the first three way catalytic device 71 mixes with the exhaust gas of the stoichiometric air-fuel ratio ST that flows out from the second three way catalytic device 72. The resultant air-fuel ratio AF3 that flows into the $NO_X$ storage catalytic device 90 is a rich air-fuel ratio that is closer to the stoichiometric air-fuel ratio than the desired rich air-fuel ratio RI is, and the exhaust gas contains HC and CO that reduces and purifies $NO_X$. Therefore, $NO_X$ will not be released as it is from the $NO_X$ storage catalytic device 90 into the atmosphere.

In this way, from time t3 the air-fuel ratio of the exhaust gas that flows into the $NO_X$ storage catalytic device 90 becomes rich and the regeneration process for the $NO_X$ storage catalytic device 90 starts. From time t5 the air-fuel ratio of the exhaust gas that flows out from the second three way catalytic device 72 also becomes the desired rich air-fuel ratio RI, and the regeneration process for the $NO_X$ storage catalytic device 90 is performed by the exhaust gas of the desired rich air-fuel ratio RI.

At time t6 when almost all of the $NO_X$ that is stored in the $NO_X$ storage catalytic device 90 is released and the regeneration process ends, there is a demand for the combustion air-fuel ratio to switch from the desired rich air-fuel ratio RI to the desired lean air-fuel ratio LE without changing the engine output. At this time, in order to switch the combustion air-fuel ratios of the first bank B1 and the second bank B2 from the desired rich air-fuel ratio RI to the desired lean air-fuel ratio LE, the opening amounts of the first throttle valve S1 and the second throttle valve S2 are simultaneously and abruptly increased from the current opening amount DR to the opening amount DL that realizes the required intake air amount QL for the desired lean air-fuel ratio LE.

The actual intake air amounts of the first bank B1 and the second bank B2 at this time change only gradually from the required intake air amount QR of the desired rich air-fuel ratio RI to the required intake air amount QL of the desired lean air-fuel ratio LE due to the response delay, and the required intake air amount QL is realized at time t7. While the combustion air-fuel ratio is being switched between time t6 and time t7, the combustion air-fuel ratios of the first bank B1 and the second bank B2 are made to match the desired rich air-fuel ratio RI, and the amount of fuel injected is increased beyond the required fuel injection quantity F, while the ignition timing is retarded. The fluctuation in output that occurs during the switch between time t6 and time t7 is comparatively large because it occurs with combustion in both the first bank B1 and the second bank B2.

For example, if an oxygen sensor is arranged immediately downstream of the $NO_X$ storage catalytic device 90 and this oxygen sensor outputs a signal indicating that the combustion air-fuel ratio has switched from the stoichiometric air-fuel ratio to the rich air-fuel ratio at time t6, which is when the regeneration process ends, then thereafter the HC and CO in the exhaust gas of the rich air-fuel ratio that flows into the $NO_X$ storage catalytic device 90 is released as it is into the atmosphere without being used to reduce and purify the $NO_X$.

Accordingly, during the switch between time t6 to t7 when the combustion air-fuel ratio is set to the desired rich air-fuel ratio RI, the concentration C of the HC and CO in the exhaust gas that flows out from the $NO_X$ storage catalytic device 90 is relatively high. If the increase in one of the opening amounts of the first throttle valve S1 and the second throttle valve S2 is delayed until after time t6 in order to reduce the torque shock felt by the driver, then the combustion air-fuel ratio would match the desired rich air-fuel ratio RI longer after time t6 by an amount of time corresponding to that delay in the corresponding bank, and the amount of HC and CO released into the atmosphere would increase even more. Therefore, although the driver will feel some degree of torque shock during the switch between time t6 and time t7, the opening amounts of the first throttle valve S1 and the second throttle valve S2 may be increased simultaneously.

For example, time t6, which is when the opening amounts of the first throttle valve S1 and the second throttle valve S2 are abruptly increased, may be a time after a set period of time has passed after time t1, which is when the opening amount of the first throttle valve S1 is abruptly decreased, or time t3, which is when the regeneration process is actually started. In this case, the amount of HC and CO released into the atmosphere while operating with the desired rich air-fuel ratio RI during a switch from the desired rich air-fuel ratio RI to the desired lean air-fuel ratio LE may be reduced by making the set period of time be a period of time until just before the regeneration process ends and executing the regeneration process even while operating with the desired rich air-fuel ratio RI during that switch.

Also, at time t6 when the regeneration process ends, the combustion air-fuel ratio during the switch when the opening amounts of the first throttle valve S1 and the second throttle valve S2 are abruptly increased may be set to the stoichiometric air-fuel ratio ST, as shown by the dotted line, instead of the desired rich air-fuel ratio RI. In this case as well, at time t7 the combustion air-fuel ratio can be switched to the desired lean air-fuel ratio LE if the required intake air amount QL for the desired lean air-fuel ratio LE is realized. Exhaust gas of the stoichiometric air-fuel ratio ST does not contain large amounts of HC and CO as does the exhaust gas of the desired rich air-fuel ratio RI. Also, the HC, CO, and $NO_X$ that are contained in the exhaust gas of the stoichiometric air-fuel ratio ST are well purified by the first three way catalytic device 71 and the second three way catalytic device 72 so the exhaust gas that flows into the $NO_X$ storage catalytic device 90 contains almost no HC and CO. Accordingly, the amounts of HC and CO released into the atmosphere during the switch between time t6 and time t7 are sufficiently reduced, as shown by the dotted line.

Also, during the switch between time t6 and time t7, the intake air amounts of the first bank B1 and the second bank B2 gradually change from the required intake air amount QR for the desired rich air-fuel ratio RI to the required intake air amount QL for the desired lean air-fuel ratio LE. In order to make the combustion air-fuel ratio match the stoichiometric air-fuel ratio ST at this time, the amount of injected fuel is first be reduced to less than the required fuel injection quantity F. Then the amount of injected fuel is gradually increased as the intake air amount increases, and finally is increased more than the required fuel injection quantity F. In accordance with this, the ignition timing is first advanced and then gradually retarded. In this way, by setting the combustion air-fuel ratio to the stoichiometric air-fuel ratio ST during the switch between time t6 and time t7, the difference between the fuel injection quantity during the switch and the required fuel injection quantity F is less than it is when the combustion air-fuel ratio is set to the desired rich air-fuel ratio RI so the necessary amount of ignition timing retard is also less. As a result, the torque shock generated during that switch is less, as shown by the dotted line. In this case, the ignition timing must be advanced as the amount of fuel injected is decreased. However, because the amount of decrease in the injected fuel is not significant as it is when the combustion air-fuel ratio is set to the desired lean air-fuel ratio, the engine output does not need to be increased that much.

Then at time t7, the combustion air-fuel ratios of the first bank B1 and the second bank B2 are switched to the desired lean air-fuel ratio LE. However, all of the stored oxygen in the first three way catalytic device 71 and the second three way catalytic device 72 has been released so until time t8 when the maximum storable amount of oxygen is stored, the air-fuel ratio of the exhaust gas that flows out from the first three way catalytic device 71 and the second three way catalytic device 72 is the stoichiometric air-fuel ratio ST. Only at time t8 does the exhaust gas that flows out from the first three way catalytic device 71 and the second three way catalytic device 72 first become the desired lean air-fuel ratio LE. In this way, between time t7 and t8, exhaust gas with the stoichiometric air-fuel ratio ST flows into the $NO_X$ storage catalytic device 90, but at this time the regeneration process has ended so there is almost no $NO_X$ stored in the $NO_X$ storage catalytic device 90, and thus $NO_X$ is not released.

Figure 3:
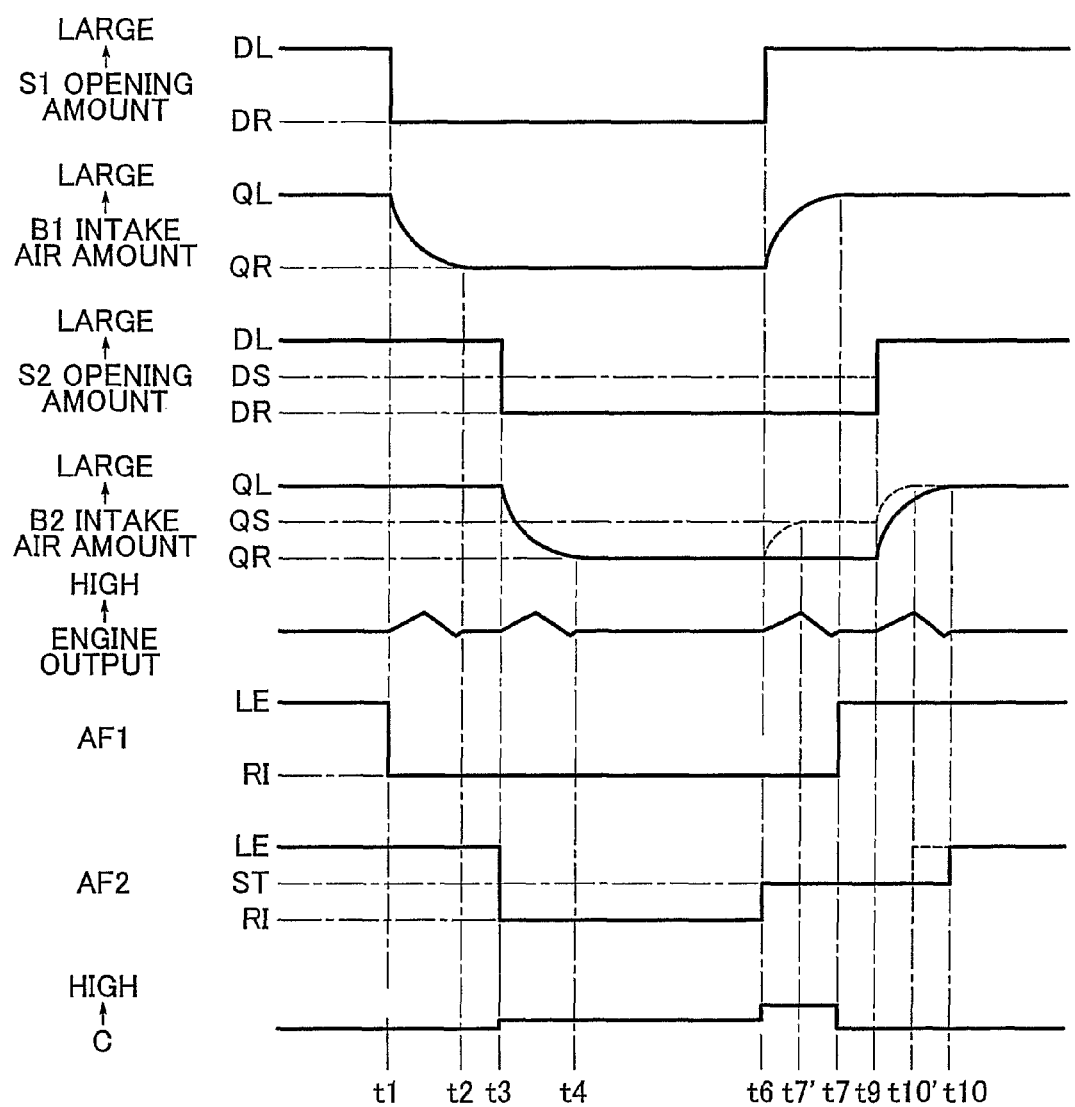
FIG. 3 is a time chart showing changes that occur when the combustion air-fuel ratio is switched in the opening amount of the first throttle valve, the opening amount of the second throttle valve, engine output, the air-fuel ratio of a first bank, the air-fuel ratio of a second bank, and the concentration of HC and CO in the exhaust gas that flows out from the $NO_X$ storage catalytic device.

FIG. 3 is another time chart illustrating a case in which the throttle valve control apparatus switches the combustion air-fuel ratio from a desired lean air-fuel ratio to a desired rich air-fuel ratio in order to perform the regeneration process on the $NO_X$ storage catalytic device 90, for example, and then switches the combustion air-fuel ratio from the desired rich air-fuel ratio to the desired lean air-fuel ratio after the regeneration process ends. Hereinafter, only the differences with respect to the time chart shown in FIG. 2 will be described. In the time chart in FIG. 3, the air-fuel ratios AF1' and AF2' of the exhaust gases that flow out from the first and second three way catalytic device 71 and 72, respectively, are omitted. Instead, the combustion air-fuel ratios AF1 and AF2 of the first and second banks B1 and B2, respectively, are shown. The control when switching the combustion air-fuel ratio from the desired lean air-fuel ratio LE to the desired rich air-fuel ratio RI is the same as that in the time chart in FIG. 2.

In the time chart in FIG. 3, at time t6 when the combustion air-fuel ratio is changed from the desired rich air-fuel ratio RI to the desired lean air-fuel ratio LE without changing the engine output, the opening amount of the first throttle valve S1, which until this time was the opening amount DR that realizes the required intake air amount QR for the desired rich air-fuel ratio RI with respect to the required fuel injection quantity F, is abruptly increased to the opening amount DL that realizes the required intake air amount QL for the desired lean air-fuel ratio LE with respect to the required fuel injection quantity F.

The actual intake air amount of the first bank B1 changes only gradually from the required intake air amount QR of the desired rich air-fuel ratio RI to the required intake air amount QL of the desired lean air-fuel ratio LE due to the response delay, and the required intake air amount QL is realized at time t7. While the combustion air-fuel ratio of the first bank B1 is being switched between time t6 and time t7, the combustion air-fuel ratio is set to the desired rich air-fuel ratio RI and the amount of injected fuel is increased to more than the required fuel injection quantity F, while the ignition timing is retarded.

Meanwhile, the opening amount of the second throttle valve S2 is kept at the opening amount DR that realizes the required intake air amount QR for the desired rich air-fuel ratio RI with respect to the required fuel injection quantity F. However, the amount of fuel injected is reduced to less than the required fuel injection quantity F and the combustion air-fuel ratio of the second bank B2 is set to the stoichiometric air-fuel ratio ST, while the ignition timing is advanced to increase the engine output. In this way, while the combustion air-fuel ratio of the first bank B1 is being switched, the combustion air-fuel ratio of the first bank B1 is set to the desired rich air-fuel ratio RI, but because the combustion air-fuel ratio of the second bank B2 is the stoichiometric air-fuel ratio ST, the concentration C of HC and CO in the exhaust gas that is discharged from the $NO_X$ storage catalytic device 90 is less than it is when the combustion air-fuel ratios in the first bank B1 and the second bank B2 are set to the desired rich air-fuel ratio RI.

In the first bank B1, the engine output may fluctuate during the switch between time t6 and time t7. However, because in the second bank B2 the intake air amount is not changed during that time, the engine output is able to be kept substantially constant by the fuel injection quantity control and the ignition timing control. As a result, the fluctuation in output that occurs between time t6 and time t7 occurs with combustion substantially only in the first bank B1 and is thus comparatively less than that which occurs with combustion in both banks B1 and B2. As a result, the torque shock felt by the driver immediately after the opening amount of the first throttle valve S1 is increased is not that large.

If at time t7 the required intake air amount QL for the desired lean air-fuel ratio LE is realized and the combustion air-fuel ratio of the first bank B1 switches to the desired lean air-fuel ratio LE, the opening amount of the second throttle valve S2 is abruptly increased at time t9, which immediately follows, to the opening amount DL that realizes the required intake air amount QL for the desired lean air-fuel ratio LE with respect to the required fuel injection quantity F.

The actual intake air amount of the second bank B2 changes only gradually from the required intake air amount QR of the desired rich air-fuel ratio RI to the required intake air amount QL of the desired lean air-fuel ratio LE due to the response delay, and the required intake air amount QL is realized at time t10. Even while the combustion air-fuel ratio of the second bank B2 is being switched between time t9 and time t10, the combustion air-fuel ratio is set to the stoichiometric air-fuel ratio ST and the amount of fuel injected that was decreased to less than the required fuel injection quantity F is gradually increased. Accordingly, the ignition timing that was advanced is gradually retarded.

In the second bank B2, the engine output may fluctuate during the switch between time t9 and time t10. However, in the first bank B1 the combustion air-fuel ratio has already been switched to the desired lean air-fuel ratio LE so the engine output does not fluctuate. Therefore, the fluctuation in output generated between time t9 and time t10 occurs with combustion only in the second bank B2 and is thus comparatively less than that which occurs with combustion in both of the banks B1 and B2. As a result, the torque shock felt by the driver immediately after the opening amount of the second throttle valve S2 is increased is not that large.

Also, by setting the combustion air-fuel ratio of the second bank B2 to the stoichiometric air-fuel ratio ST during the switch between time t9 and time t10, the difference between the fuel injection quantity during the switch and the required fuel injection quantity F is less than it is when the combustion air-fuel ratio is set to the desired rich air-fuel ratio RI so the necessary amount of ignition timing retard is also less. As a result, the torque shock generated during that switch is less.

At time t6 when the regeneration process ends, the opening amount of the second throttle valve S2 may be increased at the same time the opening amount of the first throttle valve S1 is increased, as shown by the dotted line. In this case, the opening amount of the second throttle valve S2 is abruptly increased until it matches the opening amount DS that realizes the required intake air amount QS for the stoichiometric air-fuel ratio ST with respect to the required fuel injection quantity F.

In the second bank B2, the actual intake air amount changes only gradually from the required intake air amount QR of the desired rich air-fuel ratio RI to the required intake air amount QS of the stoichiometric air-fuel ratio ST due to the response delay, and the required intake air amount QS is realized at time t7' which is before time t7. While the combustion air-fuel ratio of the second bank B2 is being switched between time t6 and time t7', the combustion air-fuel ratio is set to the stoichiometric air-fuel ratio ST and the amount of injected fuel is decreased to less than the required fuel injection quantity F, while the ignition timing is advanced.

By setting the combustion air-fuel ratio of the second bank B2 to the stoichiometric air-fuel ratio ST during the switch between time t6 and time t7', the difference between the fuel injection quantity during the switch and the required fuel injection quantity F is less than it is when the combustion air-fuel ratio is set to the desired rich air-fuel ratio RI so the necessary amount of ignition timing retard is also less. In addition, the change in the intake air amount is also less because the switch is from the required intake air amount QR of the desired rich air-fuel ratio RI to the required intake air amount QS of the stoichiometric air-fuel ratio ST. As a result, the torque shock generated in the second bank B2 during that switch is less. Accordingly, although fluctuation in engine output between time t6 and t7 occurs with combustion in the first bank B1 and the second bank B2, the output fluctuation from the second bank B2 is small so the torque shock felt by the driver is less than it is when the combustion air-fuel ratio is switched from the desired rich air-fuel ratio RI to the desired lean air-fuel ratio LE simultaneously in the first and second banks B1 and B2.

Also, at time t9, the opening amount of the second throttle valve S2 is abruptly increased from the opening amount DS that realizes the required intake air amount QS for the stoichiometric air-fuel ratio ST with respect to the required fuel injection quantity F to the opening amount DL that realizes the required intake air amount QL for the desired lean air-fuel ratio LE with respect to the required fuel injection quantity F. The required intake air amount QL is realized at time t10', which is before time t10, due to the response delay of the intake air. While the combustion air-fuel ratio of the second bank B2 is being switched between time t9 and time t10', the combustion air-fuel ratio is set to the stoichiometric air-fuel ratio ST and the amount of injected fuel is increased to more than the required fuel injection quantity F, while the ignition timing is retarded.

While the combustion air-fuel ratio of the second bank B2 is being switched between time t9 and time t10', the engine output may fluctuate. However, the change in the intake air amount is small because the switch is from the required intake air amount QS of the stoichiometric air-fuel ratio ST to the required intake air amount QL of the desired lean air-fuel ratio LE so the increases in the amount of fuel injected and the amount of ignition timing retard are less. As a result, less torque shock occurs in the second bank B2 during this switch. Also at this time, the combustion air-fuel ratio of the first bank B1 is already switched to the desired lean air-fuel ratio LE so a fluctuation in output with combustion in the first bank B1 does not occur. As a result, the fluctuation in the engine output between time t9 and time t10' occurs only with combustion in the second bank B2. In addition, the output fluctuation itself is also small so the torque shock felt by the driver is less than it is when the combustion air-fuel ratio is switched from the desired rich air-fuel ratio RI to the desired lean air-fuel ratio LE simultaneously in the first bank B1 and the second bank B2.

In the flowchart shown in FIG. 3, the first bank B1 is the bank in which the intake air amount is switched from the required intake air amount DR of the desired rich air-fuel ratio RI to the required intake air amount DL of the desired lean air-fuel ratio LE at time t6 when the regeneration process ends. Alternatively, however, that bank may be the second bank B2. In this case; the first bank B1 would be the bank in which the combustion air-fuel ratio is set to the stoichiometric air-fuel ratio ST between time t6 and time t10 or t10'.

In order to simplify the description, the length of passage from the first bank B1 to the first three way catalytic device 71, the length of passage from the first three way catalytic device 71 to the $NO_X$ storage catalytic device 90, the length of passage from the second bank B2 to the second three way catalytic device 72, and the length of passage from the second three way catalytic device 72 to the $NO_X$ storage catalytic device 90 were ignored. However, those lengths of passages do of course actually exist. Therefore, taking them into consideration, the opening amount of the second throttle valve S2 of the second bank B2 may be reduced to make the combustion air-fuel ratio of the second bank B2 the desired rich air-fuel ratio right before the exhaust gas of the desired rich air-fuel ratio flows out from the first three way catalytic device 71 in order to prevent exhaust gas of the stoichiometric air-fuel ratio from flowing into the $NO_X$ storage catalytic device 90 while the regeneration process is being performed.

As described above, the fuel injection quantity necessary to generate the same engine output with the desired lean air-fuel ratio, the stoichiometric air-fuel ratio, and the desired rich air-fuel ratio is the smallest during the desired lean air-fuel ratio and the largest during the desired rich air-fuel ratio. Accordingly, although the required fuel injection quantity F before and after the combustion air-fuel ratio is switched is constant, in actuality, the required fuel injection quantity differs depending on the selected combustion air-fuel ratio. Therefore, the fuel injection quantity control and the ignition timing control may be performed taking this into consideration.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A throttle valve control apparatus of an internal combustion engine having a first cylinder group, a second cylinder group, a first throttle valve arranged in an intake passage of the first cylinder group and a second throttle valve arranged in an intake passage of the second cylinder group, the throttle valve control apparatus comprising:
a controller that, when there is a demand to switch a combustion air-fuel ratio of the internal combustion engine without changing engine output, first changes an opening amount of the first throttle valve, and then changes an opening amount of the second throttle valve, wherein:
the internal combustion engine further includes:
a first three way catalytic device arranged in an exhaust passage of the first cylinder group,
a second three way catalytic device arranged in an exhaust passage of the second cylinder group, and
a NOX storage catalytic device arranged in a common exhaust passage of the first cylinder group and the second cylinder group downstream of the first three way catalytic device and the second three way catalytic device, and
when there is a demand to switch the combustion air-fuel ratio of the internal combustion engine from a lean air-fuel ratio to a rich air-fuel ratio without changing the engine output, the controller first reduces the opening amount of the first throttle valve to switch a combustion air-fuel ratio of the first cylinder group from the lean air-fuel ratio to the rich air-fuel ratio, and then reduces the opening amount of the second throttle valve to switch a combustion air-fuel ratio of the second cylinder group from the lean air-fuel ratio to the rich air-fuel ratio when or just before exhaust gas of the rich air-fuel ratio flows out from the first three way catalytic device.

2. The throttle valve control apparatus according to claim 1, wherein when there is a demand to switch the combustion air-fuel ratio of the internal combustion engine from a rich air-fuel ratio to a lean air-fuel ratio without changing the engine output, the controller simultaneously increases the opening amount of the first throttle valve and the opening amount of the second throttle valve to switch combustion air-fuel ratios of the first cylinder group and the second cylinder group from the rich air-fuel ratio to the lean air-fuel ratio.

3. The throttle valve control apparatus according to claim 2, wherein the demand to switch the combustion air-fuel ratio of the internal combustion engine from the rich air-fuel ratio to the lean air-fuel ration without changing the engine output occurs when regeneration of the NOX storage catalytic device ends.

4. The throttle valve control apparatus according to claim 1, wherein when there is a demand to switch the combustion air-fuel ratio of the internal combustion engine from a rich air-fuel ratio to a lean air-fuel ratio without changing the engine output, the controller increases the opening amount of one throttle valve among the first throttle valve and the second throttle valve in order to switch the combustion air-fuel ratio of one cylinder group among the first cylinder group and the second cylinder group from the rich air-fuel ratio to the lean air-fuel ratio, and increases the opening amount of the other throttle valve from among the first throttle valve and the second throttle valve at the same time as, or after, the opening amount of the one throttle valve is increased in order to switch the combustion air-fuel ratio of the other cylinder group among the first cylinder group and the second cylinder group first from the rich air-fuel ratio to the stoichiometric air-fuel ratio simultaneously with the switch in the combustion air-fuel ratio of the one cylinder group, and then from the stoichiometric air-fuel ratio to the lean air-fuel ratio.

5. The throttle valve control apparatus according to claim 4, wherein the controller increases the opening amount of the one throttle valve and reduces a fuel injection quantity in the other cylinder group without changing the opening amount of the other throttle valve, and then increases the opening amount of the other throttle valve such that the combustion air-fuel ratio of the other cylinder group becomes the lean air-fuel ratio after the opening amount of the one throttle valve is increased.

6. The throttle valve control apparatus according to claim 4, wherein the controller increases, simultaneously with the increase in the opening amount of the one throttle valve, the opening amount of the other throttle valve such that the combustion air-fuel ratio of the other cylinder group becomes the stoichiometric air-fuel ratio, and then further increases the opening amount of the other throttle valve such that the combustion air-fuel ratio of the other cylinder group becomes the lean air-fuel ratio.

7. The throttle valve control apparatus according to claim 1, wherein the controller changes an opening amount of the first throttle valve and changes a fuel injection quantity with respect to the first cylinder group.

8. The throttle valve control apparatus according to claim 1, wherein the controller changes an opening amount of the second throttle valve and changes a fuel injection quantity with respect to the second cylinder group.

9. The throttle valve control apparatus according to claim 1, wherein after reducing the opening amount of the first throttle valve, the controller increases a fuel injection quantity and retards an ignition timing with respect to the first cylinder group based on the reduced opening amount of the first throttle valve, and after reducing the opening amount of the second throttle valve, increases a fuel injection quantity and retards an ignition timing with respect to the second cylinder group based on the reduced opening amount of the second throttle valve.

10. The throttle valve control apparatus according to claim 1, wherein the demand to switch the combustion air-fuel ratio of the internal combustion engine from the lean air-fuel ratio to the rich air-fuel ratio without changing the engine output occurs to perform regeneration of the NOX storage catalytic device.

11. The throttle valve control according to claim 1, wherein when there is a demand to switch the combustion air-fuel ratio of the internal combustion engine from a rich air-fuel ratio to a lean air-fuel ratio without changing the engine output, the controller increases the opening amount of the first throttle valve to switch the combustion air-fuel ratio of the first cylinder group from the rich air-fuel ratio to the lean air-fuel ratio, and then increases the opening amount of the second throttle valve after the opening amount of the first throttle valve is increased in order to switch the combustion air-fuel ratio of the second cylinder group first from the rich air-fuel ratio to the stoichiometric air-fuel ratio simultaneously with the switch in the combustion air-fuel ratio of the first cylinder group, and then from the stoichiometric air-fuel ratio to the lean air-fuel ratio.

12. The throttle valve control apparatus according to claim 1, wherein the first cylinder group is a first bank, the second cylinder group is a second bank, and the internal combustion engine is a V-type internal combustion engine.

* * * * *